(12) United States Patent
Miyagawa et al.

(10) Patent No.: US 8,881,926 B2
(45) Date of Patent: Nov. 11, 2014

(54) FUEL FILLER PIPE

(75) Inventors: Toshiaki Miyagawa, Hiroshima (JP); Atsushi Nakasaki, Hiroshima (JP)

(73) Assignee: Keylex Corporation, Hiroshima (JP)

( * ) Notice: Subject to any disclaimer, the term of this patent is extended or adjusted under 35 U.S.C. 154(b) by 0 days.

(21) Appl. No.: 13/880,854

(22) PCT Filed: Mar. 28, 2011

(86) PCT No.: PCT/JP2011/001839
§ 371 (c)(1),
(2), (4) Date: Apr. 22, 2013

(87) PCT Pub. No.: WO2012/053126
PCT Pub. Date: Apr. 26, 2012

(65) Prior Publication Data
US 2013/0206758 A1 Aug. 15, 2013

(30) Foreign Application Priority Data

Oct. 22, 2010 (JP) ................. 2010-237904

(51) Int. Cl.
| | |
|---|---|
| *B65D 47/34* | (2006.01) |
| *B23K 11/11* | (2006.01) |
| *B23K 26/28* | (2014.01) |
| *B23K 9/028* | (2006.01) |
| *B23K 9/23* | (2006.01) |
| *B60K 15/04* | (2006.01) |
| *B23K 9/007* | (2006.01) |
| *B23K 26/32* | (2014.01) |
| *B60K 15/01* | (2006.01) |
| *B23K 11/00* | (2006.01) |
| *B23K 11/16* | (2006.01) |
| *B23K 1/00* | (2006.01) |
| *B23K 10/02* | (2006.01) |

(52) U.S. Cl.
CPC ............... *B60K 15/013* (2013.01); *B23K 11/11* (2013.01); *B23K 26/285* (2013.01); *B23K 2201/006* (2013.01); *B23K 9/0282* (2013.01); *B23K 9/232* (2013.01); *B60K 15/04* (2013.01); *B23K 9/007* (2013.01); *B23K 2203/02* (2013.01); *B23K 2201/34* (2013.01); *B23K 26/3293* (2013.01); *B23K 11/0026* (2013.01); *B23K 11/166* (2013.01); *B23K 2201/06* (2013.01); *B23K 1/0008* (2013.01); *B23K 10/02* (2013.01)
USPC ........................................ 220/86.2; 285/332

(58) Field of Classification Search
CPC .... B23K 1/0008; B23K 15/013; B23K 15/04; B23K 15/077; B23K 9/0282; B23K 11/066; B23K 9/232; B23K 9/007; B23K 10/02; B23K 11/11; B23K 26/285; B23K 26/3293; B23K 2201/006; B23K 2201/06; B23K 2201/34; B23K 2203/02
USPC ................. 220/86.2; 285/286, 332, 906, 158, 285/382.2
IPC ........................................................ B60K 15/01
See application file for complete search history.

(56) References Cited

U.S. PATENT DOCUMENTS

| | | | | |
|---|---|---|---|---|
| 3,746,209 | A * | 7/1973 | Urban et al. .................. 220/295 |
| 5,338,072 | A * | 8/1994 | Bitter et al. ................ 285/288.1 |
| 6,186,556 | B1 * | 2/2001 | Masuyama et al. ............. 285/24 |
| 6,330,893 | B1 * | 12/2001 | O'Connell ...................... 141/46 |
| 6,931,729 | B2 * | 8/2005 | Hiramatsu et al. ......... 29/890.09 |

FOREIGN PATENT DOCUMENTS

| | | |
|---|---|---|
| JP | 64-26536 U | 2/1989 |
| JP | H03-70528 U | 7/1991 |
| JP | 2010-012893 A | 1/2010 |
| JP | 2010-013006 A | 1/2010 |

OTHER PUBLICATIONS

International Search Report for Application No. PCT/JP2011/001839, dated Jun. 7, 2011.

* cited by examiner

Primary Examiner — Andrew Perreault
Assistant Examiner — James M Van Buskirk
(74) Attorney, Agent, or Firm — Alston & Bird LLP

(57) ABSTRACT

A fuel filler pipe offering high anticorrosion performance and high fabrication accuracy is provided. Specifically, a tubular fuel filler pipe body 2 made of a plated steel sheet has a fuel filler port 2a at one end thereof, and is connected at the other end thereof to a fuel tank 10. A short cylindrical retainer 3 made of stainless steel is mounted into the fuel filler port 2a, and includes first and second tube members 5 and 6 each having both open ends. An inner circumferential surface of a portion of the first tube member 5 near an opening thereof at one end thereof includes an internal thread 5a threadedly connected to an external thread C1 of a fuel cap C. The second tube member 6 is inserted through an opening of the first tube member 5 at the other end thereof into the first tube member 5, and is joined to the first tube member 5 before the internal thread 5a by resistance spot welding Sw. One of the open ends of the second tube member 6 in a direction opposite to a direction of insertion of the second tube member 6 forms an insertion hole 6a through which a nozzle G1 of a fuel filler gun G is inserted. A retainer 3 is fitted into the fuel filler pipe body 2 to allow insertion of an end portion of the fuel filler pipe body 2 near the fuel filler port 2a into a space S between an outer circumferential surface of a portion of the second tube member 6 near the insertion hole 6a and an inner circumferential surface of a portion of the first tube member 5 near the opening thereof at the other end thereof, and a portion of the retainer 3 fitted into the fuel filler pipe body 2 are continuously welded to the fuel filler pipe body 2 by brazing Tw.

2 Claims, 2 Drawing Sheets

FUEL FILLER PIPE

TECHNICAL FIELD

The present invention relates to fuel filler pipes serving as, e.g., a passage through which fuel, such as gasoline, is fed into a fuel tank of a vehicle.

BACKGROUND ART

Generally, a vehicle is provided with a fuel filler pipe serving as a passage through which fuel is fed into a fuel tank, and the fuel filler pipe includes a tubular fuel filler pipe body having a fuel filler port at one end thereof and connected at the other end thereof to a fuel tank, and a short cylindrical retainer mounted into the fuel filler port. The retainer is inserted into a portion of the fuel filler pipe body near the fuel filler port so as to be fitted into the fuel filler pipe body, and is mounted into the fuel filler port of the fuel filler pipe body by continuously welding a portion of the retainer fitted thereinto to the fuel filler pipe body, e.g., by brazing.

For example, a fuel filler pipe described in Japanese Patent Publication No. 2010-12893 includes a retainer made of stainless steel, and a fuel filler pipe body made of a plated steel sheet to prolong the life cycle of a vehicle, thereby ensuring necessary anticorrosion performance.

SUMMARY

However, since, in the fuel filler pipe of Japanese Patent Publication No. 2010-12893, different materials are used as materials of the retainer and the fuel filler pipe body, this tends to cause galvanic corrosion of a portion of the fuel filler pipe in which the fuel filler pipe body and the retainer overlap each other due to the potential difference therebetween. In this case, the stainless steel forming the retainer is located in an inner portion of the portion of the fuel filler pipe in which the fuel filler pipe body and the retainer overlap each other, and the plated steel sheet forming the fuel filler pipe body is located in an outer portion of the portion of the fuel filler pipe; therefore, with the start of corrosion, the outer fuel filler pipe body starts suffering corrosion earlier to prevent the airtightness of the fuel filler pipe from being maintained.

The retainer is covered with a fuel cap, and thus, when the fuel filler pipe is fabricated, the concentricity precision and roundness precision of the retainer need to be increased. However, in Japanese Patent Publication No. 2010-12893, when the retainer is mounted to the fuel filler pipe body, a large amount of heat is continuously applied to the outer circumferential surface of the retainer by continuous welding, and thus, the retainer tends to be thermally strained, thereby decreasing the concentricity precision and roundness precision of the retainer when the fuel filler pipe is completed.

It is therefore an object of the present invention to provide a fuel filler pipe offering high anticorrosion performance and high fabrication accuracy.

In order to achieve the object, a feature of the present invention is that: a retainer is divided into two tube members; while one of the tube members is inserted into the other one thereof so as to be mounted thereto by spot welding, a fuel filler pipe body and the other tube member are located one on the other such that an end portion of the fuel filler pipe body near a fuel filler port is located inside the other tube member, and a portion of the fuel filler pipe body overlapping the other tube member is continuously welded to the other tube member to mount the retainer to the fuel filler pipe body.

To be specific, in a fuel filler pipe including: a tubular fuel filler pipe body made of a plated steel sheet, having one end having a fuel filler port which is covered with a fuel cap to be able to be opened or closed, and through which a nozzle of a fuel filler gun is inserted, and having the other end connected to a fuel tank; and a short cylindrical retainer mounted into the fuel filler port, and made of stainless steel, the following measures are taken.

Specifically, in a first aspect of the invention, the retainer includes first and second tube members each having both open ends, an inner circumferential surface of a portion of the first tube member near an opening of the first tube member at one end thereof includes an internal thread threadedly connected to an external thread of the fuel cap, the second tube member is inserted through an opening of the first tube member at the other end of the first tube member into the first tube member, and is spot welded to the first tube member while overlapping the first tube member before the internal thread, one of the open ends of the second tube member in a direction opposite to a direction of insertion of the second tube member is smaller than the other one of the open ends of the second tube member in the direction of insertion of the second tube member, and forms an insertion hole through which the nozzle of the fuel filler gun is insertable and removable, a space is formed between an outer circumferential surface of a portion of the second tube member near the insertion hole and an inner circumferential surface of a portion of the first tube member near the opening of the first tube member at the other end of the first tube member, the retainer is fitted into the fuel filler pipe body to allow insertion of an end portion of the fuel filler pipe body near the fuel filler port into the space, and a portion of the retainer fitted into the fuel filler pipe body are continuously welded to the fuel filler pipe body to mount the retainer into the fuel filler port of the fuel filler pipe body.

According to a second aspect of the invention, in the first aspect of the invention, the fuel filler pipe body may be made of a welded tube formed from a plated steel sheet in a shape of a pipe.

According to the first aspect of the invention, the plated steel sheet forming the fuel filler pipe body is located in an inner portion of a portion of the fuel filler pipe in which the fuel filler pipe body and the retainer overlap each other, and the stainless steel forming the retainer is located in an outer portion of the portion of the fuel filler pipe; therefore, even when corrosion due to the potential difference between different materials occurs, the inner fuel filler pipe body starts suffering corrosion earlier, thereby facilitating maintaining the airtightness of the fuel filler pipe to provide a fuel filler pipe offering high anticorrosion performance. The retainer is divided into the first tube member having the internal thread, and the second tube member having the insertion hole, and the second tube member is mounted to the first tube member by spot welding; therefore, the amount of thermal strain is smaller than when the members are continuously welded together, e.g., by brazing, and thus, the deformation of the internal thread of the retainer can be reduced to a minimum. Furthermore, the first tube member and the second tube member overlap each other, and while the retainer is mounted to the fuel filler pipe body, a portion of the fuel filler pipe having rigidity increased due to the overlap is located between the internal thread of the retainer and a continuous weld. Therefore, a portion of the fuel filler pipe in which the first tube member and the second tube member overlap each other makes it difficult to exert the influence of the heat of the continuous weld on the internal thread to reduce the deformation of the internal thread due to thermal strain, thereby providing a fuel filler pipe with high fabrication accuracy.

According to the second aspect of the invention, the end portion of the fuel filler pipe body near the fuel filler port is located inside the retainer, and thus, the fuel filler pipe body is formed along the retainer by treating only the outer surface of a weld bead formed on the fuel filler pipe body made of a welded tube. Therefore, the surface of the weld bead is more easily treated than when, as in Japanese Patent Publication No. 2010-12893, the end portion of the fuel filler pipe body near the fuel filler port is located outside the retainer, and thus, the treatment of the inner surface of the weld bead is required in order to form the fuel filler pipe body along the retainer, thereby allowing the process cost to be low.

BRIEF DESCRIPTION OF THE DRAWINGS

Figure 1:
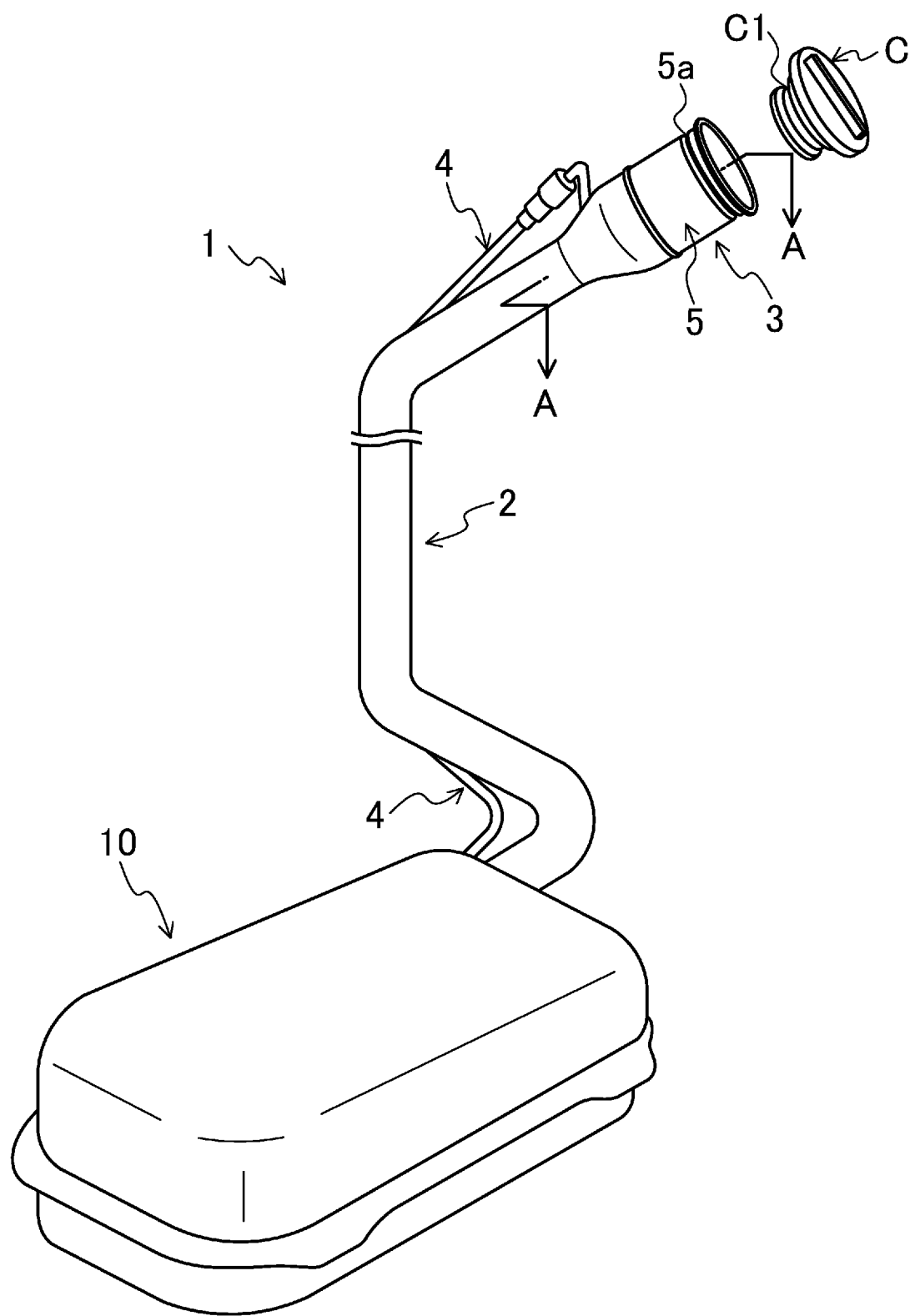
Figure 2:
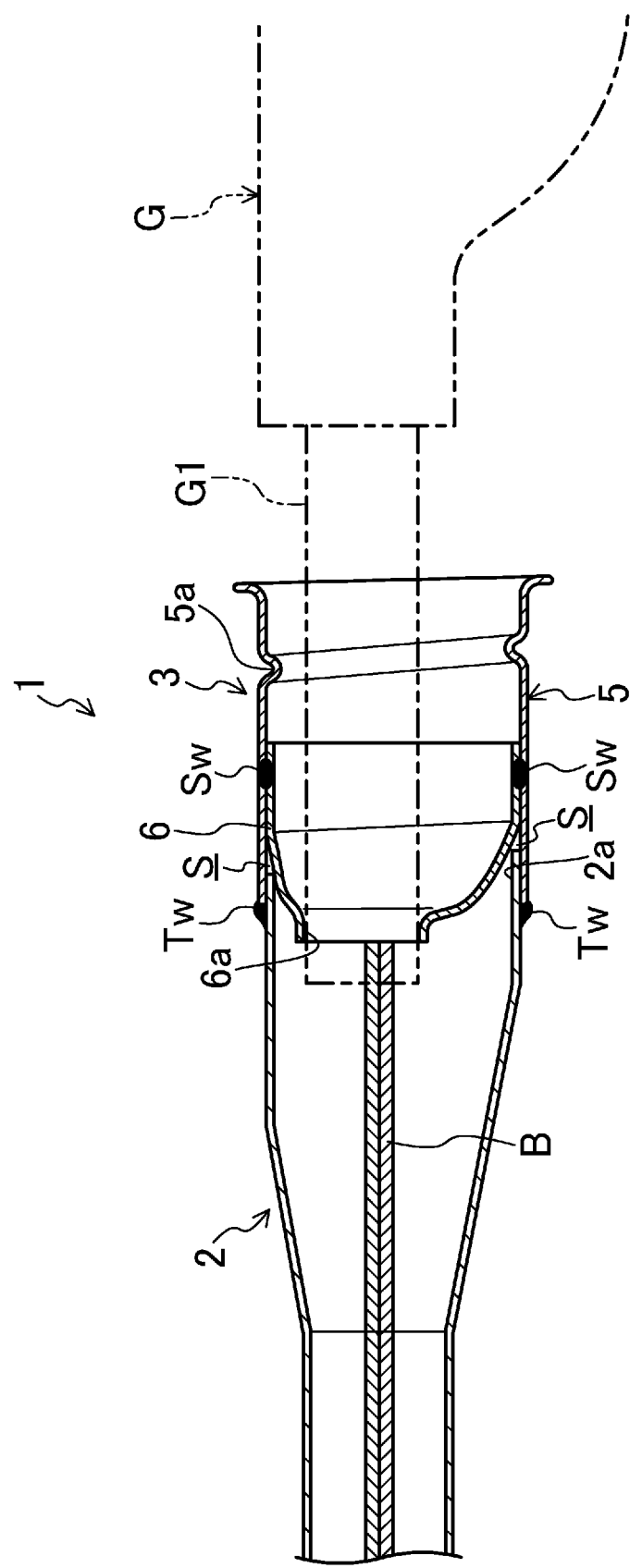

Having thus described the invention in general terms, reference will now be made to the accompanying drawings, which are not necessarily drawn to scale, and wherein:

FIG. 1 is a perspective view of a fuel filler pipe according to an embodiment of the present invention, a fuel tank to which the fuel filler pipe is connected, and a fuel cap with which a fuel filler port is covered; and FIG. 2 is a cross-sectional view taken along the line A-A in FIG. 1.

DESCRIPTION OF EMBODIMENT

An embodiment of the present invention will be described hereinafter in detail with reference to the drawings. The following preferred embodiment is set forth merely for the purposes of examples in nature.

FIG. 1 illustrates a fuel filler pipe 1 according to the embodiment of the present invention. The fuel filler pipe 1 serves as a fuel passage through which fuel is fed into a fuel tank 10 of a vehicle, and includes a generally cylindrical fuel filler pipe body 2 having a fuel filler port 2a at one end thereof, connected at the other end thereof to the fuel tank 10, and made of a plated steel sheet, a generally short cylindrical retainer 3 mounted into the fuel filler port 2a and made of stainless steel, and a small cylindrical bleeder tube 4 through which during the feeding of fuel, air containing fuel vapor is released from the fuel tank 10 to the one end of the fuel filler pipe body 2.

The fuel filler pipe body 2 is formed using a welded tube obtained by rolling a plated steel sheet with an equal thickness into a tube and welding joints of the steel sheet together; the diameter of a portion of the fuel filler pipe body 2 near the fuel filler port 2a is increased; the fuel filler port 2a is covered with a fuel cap C to be able to be opened or closed; and a nozzle G1 of a fuel filler gun G (illustrated in FIG. 2) is inserted through the fuel filler port 2a. As illustrated in FIG. 2, a weld bead B is formed on the joints of the fuel filler pipe body 2, and only the outer surface of the weld bead B is treated such that the outer circumferential surface of the fuel filler pipe body 2 is flush. The inner surface of the weld bead B is not treated, and thus, a portion of the inner circumferential surface of the fuel filler pipe body 2 corresponding to the weld bead B is raised.

The retainer 3 is formed by pressing stainless steel, and consists of a first tube member 5 and a second tube member 6 each having both open ends.

An inner circumferential surface of a portion of the first tube member 5 near an opening thereof at one end thereof includes a single internal thread 5a threadedly connected to an external thread C1 of the fuel cap C.

In contrast, the second tube member 6 is inserted through an opening of the first tube member 5 at the other end thereof into the first tube member 5, is joined at a plurality of spots along its outer circumferential surface to the first tube member 5 by resistance spot welding Sw while overlapping the first tube member 5 before the internal thread 5a so as to be mounted to the first tube member 5, and forms a substantial bowl shape in which the diameter of the second tube member 6 is gradually decreased in a direction opposite to the direction of insertion of the second tube member 6. The open end of the second tube member 6 in the direction opposite to the direction of insertion of the second tube member 6 is smaller than the open end thereof in the direction of insertion of the second tube member 6, and forms an insertion hole 6a into or from which the nozzle G1 of the fuel filler gun G is insertable and removable, and the center axis of the insertion hole 6a deviates from the axis of the second tube member 6.

As illustrated in FIG. 2, the second tube member 6 has a space S between an outer circumferential surface of a portion of the second tube member 6 near the insertion hole 6a and an inner circumferential surface of a portion of the first tube member 5 near the opening at the other end thereof while being mounted to the first tube member 5; the retainer 3 is fitted into the fuel filler pipe body 2 to allow insertion of an end portion of the fuel filler pipe body 2 near the fuel filler port 2a into the space S, and a portion of the retainer 3 fitted thereinto is continuously MIG welded to the fuel filler pipe body 2 by brazing Tw, thereby mounting the retainer 3 into the fuel filler port 2a of the fuel filler pipe body 2.

While, in this embodiment, the second tube member 6 is mounted to the first tube member 5 by resistance spot welding Sw, such a process is not limited, and the members may be spot welded together at a plurality of spots, e.g., by arc spot welding.

While the first tube member 5 is mounted to the fuel filler pipe body 2 by continuously MIG welding them together by brazing Tw, such a process is not limited, and for example, continuous laser welding, continuous plasma welding, continuous TIG welding may be performed by brazing Tw, or any continuous welding processes other than the above-described process may be used.

Next, fabrication of the fuel filler pipe 1 will be described in detail.

First, the first and second tube members 5 and 6 of the retainer 3 each formed by press forming, and a fuel filler pipe body 2 obtained by subjecting a welded tube formed from a plated steel sheet to a predetermined process are prepared.

The second tube member 6 is inserted through the opening of the first tube member 5 at the other end thereof into the first tube member 5. Thereafter, the second tube member 6 is joined at a plurality of spots along its outer circumferential surface to the first tube member 5 by resistance spot welding Sw while overlapping the first tube member 5 before the internal thread 5a of the first tube member 5, thereby mounting the second tube member 6 to the first tube member 5.

Next, the retainer 3 is fitted into the fuel filler pipe body 2 to allow insertion of the end portion of the fuel filler pipe body 2 near the fuel filler port 2a into the space S formed between the outer circumferential surface of the portion of the second tube member 6 near the insertion hole 6a and the inner circumferential surface of the portion of the first tube member 5 near the opening at the other end thereof. An outer circumferential surface of a portion of the fuel filler pipe body 2 near one end thereof and the other end of the first tube member 5 are continuously MIG welded together by brazing Tw, thereby mounting the retainer 3 into the fuel filler port 2a of the fuel filler pipe body 2.

In view of the above, according to the embodiment of the present invention, the plated steel sheet forming the fuel filler pipe body 2 is located in an inner portion of a portion of the fuel filler pipe 1 in which the fuel filler pipe body 2 and the retainer 3 overlap each other, and the stainless steel forming the retainer 3 is located in an outer portion of the portion of the fuel filler pipe 1; therefore, even when corrosion due to the potential difference between different materials occurs, the inner fuel filler pipe body 2 starts suffering corrosion earlier, thereby facilitating maintaining the airtightness of the fuel filler pipe 1 to provide a fuel filler pipe 1 offering high anticorrosion performance. The retainer 3 is divided into the first tube member 5 having the internal thread 5a, and the second tube member 6 having the insertion hole 6a, and the second tube member 6 is mounted to the first tube member 5 by resistance spot welding Sw; therefore, the amount of thermal strain is smaller than when the members are continuously welded together, e.g., by brazing Tw, and thus, the deformation of the internal thread 5a of the retainer 3 can be reduced to a minimum. Furthermore, the first tube member 5 and the second tube member 6 overlap each other, and a portion of the fuel filler pipe 1 having rigidity increased due to the overlap is located between the internal thread 5a of the retainer 3 and a continuous weld formed by brazing Tw with the retainer 3 mounted to the fuel filler pipe body 2. Therefore, a portion of the fuel filler pipe 1 in which the first tube member 5 and the second tube member 6 overlap each other makes it difficult to exert the influence of the heat of the continuous weld formed by brazing Tw on the internal thread 5a to reduce the deformation of the internal thread 5a due to thermal strain, thereby providing a fuel filler pipe I with high fabrication accuracy. In addition, since the retainer 3 is made of stainless steel, the weight of the entire fuel filler pipe 1 can be reduced, a necessary rigidity of a portion of the fuel filler pipe 1 around the fuel filler port 2a can be simultaneously ensured, and the fuel cap C with which the retainer 3 is covered can be prevented from easily dropping off or being broken in the event of a collision.

The end portion of the fuel filler pipe body 2 near the fuel filler port 2a is located inside the retainer 3, and thus, the fuel filler pipe body 2 is formed along the retainer 3 by treating only the outer surface of the weld bead B formed on the fuel filler pipe body 2 made of a welded tube. Therefore, the surface of the weld bead B is more easily treated than when, as in Japanese Patent Publication No. 2010-12893, the end portion of the fuel filler pipe body 2 near the fuel filler port 2a is located outside the retainer 3, i.e., when the inner surface of the weld bead B needs to be treated in order to form the fuel filler pipe body 2 along the retainer 3, thereby allowing the process cost to be low.

The present invention is suitable for, e.g., fuel filler pipes through each of which fuel injected through a fuel filler port of a vehicle is guided into a fuel tank.

The invention claimed is:

1. A fuel filler pipe comprising:
   a tubular fuel filler pipe body made of a plated steel sheet, having one end having a fuel filler port which is covered with a fuel cap to be able to be opened or closed, and through which a nozzle of a fuel filler gun is inserted, and having the other end connected to a fuel tank; and
   a short cylindrical retainer mounted into the fuel filler port, and made of stainless steel, wherein
   the retainer includes first and second tube members each having both open ends,
   an inner circumferential surface of a portion of the first tube member near an opening of the first tube member at one end thereof includes an internal thread threadedly connected to an external thread of the fuel cap,
   the second tube member is inserted through an opening of the first tube member at the other end of the first tube member into the first tube member, and is spot welded to the first tube member while overlapping the first tube member before the internal thread,
   one of the open ends of the second tube member in a direction opposite to a direction of insertion of the second tube member is smaller than the other one of the open ends of the second tube member in the direction of insertion of the second tube member, and forms an insertion hole through which the nozzle of the fuel filler gun is insertable and removable,
   a space is formed between an outer circumferential surface of a portion of the second tube member near the insertion hole and an inner circumferential surface of a portion of the first tube member near the opening of the first tube member at the other end of the first tube member, and
   the first tube member of the retainer is fitted to an outer surface of the fuel filler pipe body to allow insertion of an end portion of the fuel filler pipe body near the fuel filler port into the space, and a portion of the retainer fitted into the fuel filler pipe body are continuously welded to the fuel filler pipe body to mount the retainer into the fuel filler port of the fuel filler pipe body.

2. The fuel filler pipe of claim 1, wherein the fuel filler pipe body is made of a welded tube formed from a plated steel sheet in a shape of a pipe.

* * * * *